United States Patent [19]

Siemers et al.

[11] Patent Number: 4,590,090
[45] Date of Patent: May 20, 1986

[54] METHOD FOR MAKING INTERDIFFUSED, SUBSTANTIALLY SPHERICAL CERAMIC POWDERS

[75] Inventors: Paul A. Siemers, Clifton Park; Casimir W. Krystyniak, Schenectady, both of N.Y.

[73] Assignee: General Electric Company, Schenectady, N.Y.

[21] Appl. No.: 402,706

[22] Filed: Jul. 28, 1982

[51] Int. Cl.$^4$ .............. B05D 1/00; B05D 1/08; C01G 25/02
[52] U.S. Cl. .................. 427/34; 423/593; 423/608; 423/252; 423/263; 423/592
[58] Field of Search ............. 423/593, 608; 427/34

[56] References Cited

U.S. PATENT DOCUMENTS

| | | | |
|---|---|---|---|
| 3,373,119 | 3/1968 | Krystyniak | 423/593 |
| 3,429,962 | 2/1969 | Krystyniak | 264/81 |
| 3,881,911 | 5/1975 | Cheney et al. | 423/593 |
| 4,328,285 | 5/1982 | Siemens et al. | 428/633 |

*Primary Examiner*—Herbert T. Carter
*Attorney, Agent, or Firm*—Paul E. Rochford; James C. Davis, Jr.; Paul R. Webb, II

[57] ABSTRACT

Substantially homogeneous, substantially spherical interdiffused metallic oxide particles, especially useful in plasma spraying applications, are readily and economically prepared from constituent metal oxide powders by the method of this invention which includes the step of heating a mass of discrete agglomerated particles under conditions of temperature and time sufficient to interdiffuse the constituent metallic oxides within the agglomerates, but insufficient to sinter the agglomerates together.

2 Claims, No Drawings

METHOD FOR MAKING INTERDIFFUSED, SUBSTANTIALLY SPHERICAL CERAMIC POWDERS

BACKGROUND OF THE INVENTION

This invention relates generally to metallic oxide (i.e., ceramic) particles and to methods of their preparation and, more particularly, to substantially homogeneous, substantially spherical interdiffused metallic oxide particles and to methods of preparation of such particles from constituent metallic oxide powders.

Metallic oxide particles, typically comprising two or more metallic oxide powders, are useful in a variety of applications. A typical application is as a thermal barrier coating applied to gas turbine hot-gas-path metallic components. The thermal barrier coatings reduce the temperature of the metallic components, thereby increasing both the useful lives of the metallic components and turbine operating efficiencies. A typical method of applying thermal barrier coatings is to introduce the metallic oxide particles into plasma spraying apparatus which heats the particles to an elevated temperature sufficient to render the particles at least partially molten, propels the molten particles to the surface of the components to be coated, and causes the molten particles to impinge upon the component and rapidly cool thereby forming a solid ceramic thermal barrier coating over the component.

It is highly desirable that the metallic oxide particles for plasma spraying be substantially spherical in configuration in order that they flow freely through the plasma spraying device. Typically, preferred sizes for plasma sprayable particles are $-200+325$ mesh (44 to 74 $\mu$m particle diameter). It is also highly desirable that the individual particles be as uniform as possible in composition in order to provide chemically homogeneous barrier coatings.

Metallic oxide particles may be formed from constituent metal oxide powders by several techniques. One such method involves the teachings of Krystyniak of U.S. Pat. No. 3,373,119, assigned to the same assignee as the present invention and incorporated herein by reference, wherein a slurry, made by adding a liquid vehicle and at least an organic binder to a dry blended mix of the constituent powdered metal oxides, is spray dried by equipment such as is shown in the U.S. Pat. No. 3,373,119, collected and sieved to final size. The product of this process is a mass of discrete agglomerated metal oxide particles substantially spherical in configuration and substantially uniform in composition. It has been found, however, that the discrete particles of agglomerated metal oxides produced by the Krystyniak process are substantially uniform in composition only on a macroscopic scale, i.e., there is generally little or no interdiffusion of the constituent metallic oxides such as to form a homogeneous solid solution, due to the relatively low temperatures at which the spray drying is conducted. In this art, it is also frequently common to refer to the resultant agglomerated particles of this and similar processes as "powders" in their own right.

Other means of preparing ceramic particles include (a) mixing the constituent metallic oxide powders together, pressing and binding the blend together to form an electrode, and arc melting the electrode to form a solidified mass which is then crushed, milled and sieved to yield the ceramic particles and (b) mixing the constituent metallic oxide powders together, pressing and binding the blend together to form briquettes, sintering the briquettes at an elevated temperature, and then crushing and milling the briquettes and sieving the product to yield ceramic particles in the desired size range.

The above-discussed (a) and (b) methods involve time consuming and expensive milling, crushing and sieving operations. Further, although the product of the above-discussed (a) and (b) methods is more physically and chemically homogeneous (i.e., interdiffused) than the particles produced by the above-discussed Krystyniak process, the vast majority of the particles produced as a result of the crushing process are angular in configuration as opposed to the free-flowing spherical configuration particularly desirable for use in plasma spraying applications. Adding to the expense of these methods is the low level of controllability which can be exercised over the yield of particles having sizes within a desired range such as $-200+325$ mesh.

Yet another means of preparing ceramic particles involves the process of dissolving soluble salts of the metals, such as the nitrates of the metals, in an aqueous media; coprecipitating the metals as oxalates or acetates from the aqueous media; and calcining the mixed products at about 1,000° C. or greater to decompose the oxalates or acetates to form oxides of the metals. The chemically combined products of this expensive and involved process are generally characterized as "clumps", i.e., neither angular nor spherical in configuration, and generally are smaller than about 20–30 microns ($\mu$m) which is generally smaller than the size range preferred for plasma spraying applications.

Thus, based on the above discussion, prior to the invention described herein, there existed a need for an inexpensive process for making substantially homogeneous, substantially spherical metallic oxide particles.

BRIEF DESCRIPTION OF THE INVENTION

Based on the method of the present invention, it is now possible to produce substantially homogeneous, substantially spherical metallic oxide particles from constituent metallic oxide powders. The method of the present invention provides economic as well as technical advantages as it does not require the expensive and time consuming crushing and milling steps required of prior art processes which produce substantially homogeneous, but generally not substantially spherical, particles. Due to the chemical uniformity, spherical configuration, and favorable particle size distribution, the metallic oxide particles of this invention are particularly suitable for plasma spraying applications.

Briefly, and in its most general aspects, the method of the instant invention comprises the steps of (a) providing a dry blend of at least a first metal oxide powder and a second metal oxide powder in the desired proportions; (b) preparing a slurry of the dry blend in a liquid which includes at least a fluid vehicle and a binder; (c) spray drying the slurry to form a mass of discrete agglomerated particles (agglomerates) of the oxide powders which are substantially spherical in configuration and have a predetermined distribution of agglomerate diameters; (d) heating the mass of agglomerated particles under conditions of time and low temperature sufficient to burn off the binder from the agglomerated particles, but insufficient to fracture the agglomerated particles; (e) heating the mass of discrete agglomerated particles under conditions of time and a high temperature sufficient to interdiffuse the metal oxides within the agglomerated particles, but insufficient to sinter the agglomerated particles together, forming thereby a porous, weakly interconnected, friable mass of interdiffused particles; and (f) mechanically agitating the porous, friable mass to form a mass of substantially homogeneous, substantially spherical discrete ceramic particles having substantially the same distribution of particle diameters as the agglomerate diameters which resulted from the spray drying step.

The last step of the above-described batch process embodiment of the instant invention could be replaced by a substantially continuous process embodiment by introducing the spray dried agglomerated particles into a rotary kiln and conducting the interdiffusion treatment in the rotary kiln under conditions of substantially constant mechanical agitation to yield the substantially homogeneous, substantially spherical particles directly.

Briefly described, the products of the invention are discrete, substantially homogeneous (i.e., chemically and physically uniform), substantially spherical metallic oxide (ceramic) particles having a predetermined distribution of particle diameters which are particularly suitable for plasma spraying applications.

DETAILED DESCRIPTION OF THE INVENTION

In the practice of the present invention, the constituent (i.e., component) finely-divided metallic oxide powders are first dry blended in a blender, or otherwise mixed together, in the desired proportions to form a blended metallic oxide powder. Suitable constituent metal oxide powder blends include, for example, those characterized by oxygen ion conductivity upon stabilization including principally unstabilized zirconia ($ZrO_2$) and undoped thoria ($ThO_2$) and a stabilizer (or dopant for thoria). The stabilizing metallic oxide comprises at least one or a combination of several specific oxides, such as calcium oxide (CaO), a mixture of rare earth oxides, ytterbium oxide ($Yb_2O_3$), and yttrium oxide ($Y_2O_3$) as described by Krystyniak in his U.S. Pat. No. 3,429,962 which is also assigned to the same assignee as the instant invention and is also incorporated herein by reference. Upon stabilization (or doping) the principal metallic oxide is rendered resistant to large volume changes upon thermal cycling and hence is made mechanically stable.

Other useful metal oxide powder blends include, for example, those useful for the preparation of high temperature fuel cell components which exhibit both ionic and electronic conductivity and comprise a first metal oxide selected from the group consisting of zirconia and thoria with the first metal oxides being stabilized with one or more oxides selected from the group consisting of calcium oxide, yttrium oxide, ytterbium oxide, and a mixture of rare earth oxides, and a second metal oxide selected from the group consisting of iron oxide, cobalt oxide, nickel oxide, titanium oxide, zinc oxide, titanium oxide-iron oxide, zinc oxide-iron oxide and zinc oxide-lead oxide as described in the above-identified U.S. Pat. No. 3,373,119 to Krystyniak.

Still other useful metal oxide powder blends include, for example, zirconium oxide stabilized with cerium oxide and plasma sprayable to form a ceramic coating useful for improving the resistance of superalloy turbine components to accelerated oxidation or corrosion failure resulting from exposure to turbine fuel having vanadium or sulfur oxide impurities therein as is described in U.S. Pat. No. 4,328,285 to Siemers et al., which is also assigned to the same assignee as the instant invention and is also incorporated herein by reference.

Following the dry blending, a slurry is prepared by adding a liquid vehicle to the blended metallic oxide powder. The resulting slurry typically has at least about 50%, and up to about 75%, solids by weight. The liquid vehicle comprises from 100% to 35% water by weight and from 0% to 65% alcohol, such as denatured alcohol, by weight. Additionally, it is desirable to add an organic binder, such as methyl cellulose (e.g., "Methocel" as marketed by the Dow Chemical Company), to the liquid in an amount from 1.5% to 2.25%, by weight. It is also desirable to add 1.0% to 30% of a dispersant, such as triethanolamine, by weight. An anti-foamant, such as 2-octanol, may also desirably be added to the liquid vehicle in amounts of from about 1 to 3%, by weight.

The slurry is next spray dried in equipment such as is shown in the above-referenced U.S. Pat. No. 3,373,119, to yield a mass of discrete particles of agglomerated metal oxides (i.e., agglomerates) substantially spherical in configuration and substantially uniform in composition on a macroscopic, but not atomic, scale. A degree of control over the distribution of the diameters of the spray dried particles can be obtained at this stage of the process by adjusting the process parameters, particularly the nozzle in the spray drying equipment and the percentage of binder in the liquid vehicle.

Next, the mass of agglomerates is heated to a low temperature for a time sufficient to vaporize or burn off the binder from the particles. The temperature selected will be determined by the binder used. For methyl cellulose, a temperature in the range of from between 200° C. to 400° C. is generally sufficient. The heating is continued until all of the binder has been vaporized or burned off. At the higher temperature (400° C.) the binder will burn with a soft blue flame as it leaves the mass of agglomerates, thus cessation of the blue flame readily may be used as an end-point indicator for this stage of the process. In order to avoid fracturing the agglomerates, the rate of heating to the low temperature should be as low as practicable. A rate of about 100° C./hr has been found effective for most agglomerates.

After the binder has been burned off, the mass of agglomerates is heated under conditions of time and a high temperature sufficient to interdiffuse the metal oxides within the agglomerates, but insufficient to sinter the agglomerates together, to form a porous, weakly interconnected, friable mass of particles. The actual interdiffusion temperature used and the duration of the interdiffusion treatment will be a function of the metal oxides making up the agglomerates. Suitable conditions can readily be determined by the practitioner on a trial and error basis once the principles of the invention, as taught herein, are appreciated and understood. The interdiffusion temperature will, therefore, be bracketed at the high end of the range by temperatures which cause excessive sintering of the agglomerates (i.e., the resulting mass will not be friable) and at the low end of the range by temperatures sufficient for the constituent metal oxides to interdiffuse and to do so completely in an economically reasonable period of time.

Lastly, the porous, friable mass is mechanically agitated to form a mass of discrete substantially homogeneous, substantially spherical ceramic particles having substantially the same distribution of particle diameters as the agglomerate diameters which resulted from the spray drying step. The mechanical agitation need not be extensive since the particles are optimally only weakly connected together.

The detailed description above is for the batch process embodiment of the instant invention. Alternatively, the spray dried agglomerates may be introduced into and the interdiffusion treatment conducted in a rotary kiln device thus providing a substantially continuous embodiment of the present invention. The continuous embodiment is more desirable for economically producing large quantities of discrete substantially homogeneous, substantially spherical ceramic particles and provides the further advantage of minimizing inter-agglomerate sintering due to the substantially constant mechanical agitation provided by the rotary kiln.

In order that those skilled in the art will be better able to practice the present invention, the following examples are given by way of illustration and not by way of limitation. All parts are by weight unless otherwise noted.

EXAMPLE I

Zirconia-30 wt. % yttria (i.e., 19 mole % yttria) particles suitable for plasma spraying to form ceramic barrier coatings on gas turbine hot-gas-path metallic components were prepared by the method of the invention by first dry blending 1400 grams of finely powdered unstabilized zirconia ($ZrO_2$) having a monoclinic crystal structure with 600 grams of finely powdered 99.9% pure yttria ($Y_2O_3$) having a body centered cubic crystal structure.

To 2000 ml of distilled water, 40 grams of 15 centipoise viscosity "Methocel" binder was added and dissolved. The binder solution was mixed with the blended $ZrO_2$ and $Y_2O_3$ powders and to this slurry 25 ml of triethanolamine dispersant and 2 ml of 2-octanol antifoamant were added. The entire mix was transferred to a large ball mill consisting of a plastic container with ⅜" diameter $ZrO_2$ balls and the mix was milled overnight. After completion of the ball milling, a stable $Y_2O_3$-$ZrO_2$ slip/binder mix was obtained which was suitable for spray drying. The slip was spray dried in a laboratory spray dryer that had been adjusted to yield a particle size distribution centered about the 44–74 μm (−200+325 mesh) particle size range. After spray drying, the agglomerated particles were free-flowing and microscopic examination of the individual agglomerates revealed that almost all of the agglomerates were spherical, consisting of agglomerated $Y_2O_3$ and $ZrO_2$ particles. X-ray diffraction measurements of the agglomerated particles revealed that the constituents were cubic $Y_2O_3$ and monoclinic $ZrO_2$. This is the state of such agglomerated particles following formation by the Krystyniak process of U.S. Pat. No. 3,373,119.

The spray dried agglomerated particles were next subjected to a careful heat treatment. Before the heat treatment, the spray dried agglomerated particles were loosely poured into a platinum crucible. The crucible was initially placed in a furnace and heated at about 100° C./hr to 400° C. where it was held for 2 hours. The heat treat at 400° C. burned away the Methocel binder without breaking down, i e., fracturing, the agglomerated particles. To achieve interdiffusion of $Y_2O_3$ and $ZrO_2$ the agglomerated particles were heated from 400° C. to 1400° C. and held at 1400° C. for 8 hours. X-ray diffraction analysis of the particles after the 1400° C. heat treatment revealed that the particles were principally cubic (stabilized) $ZrO_2$ with small amounts of monoclinic $ZrO_2$ and cubic $Y_2O_3$, i.e., the interdiffusion had proceeded almost to completion.

To complete the stabilization of $ZrO_2$, the particles were further heated from 1400° C. to 1650° C. over a 2-hour period, held at 1650° C. for 1 hour and then furnace cooled to room temperature. X-ray diffraction analysis after heat treatment to 1650° C. revealed that only a cubic solid solution of $Y_2O_3$ in $ZrO_2$ with a lattice parameter of $a_0 = 5.160 \pm 0.002$ Å remained. The X-ray pattern had sharp, well-resolved $K\alpha_1$ and $K\alpha_2$ doublets which is characteristic of a homogeneous solid solution. After the heat treatment the previously flowable agglomerates had become a porous, friable mass which could be easily broken down to nearly the original agglomerate size distribution by gentle grinding with a mortar and pestle. After grinding, the particles were microscopically spherical, free-flowing, and suitable for plasma spraying.

EXAMPLE II

Zirconia-26 wt. % ceria (i.e., 20 mole % ceria) particles suitable for plasma spraying to form ceramic barrier coatings on gas turbine hot-gas-path metallic components were prepared by the method of the invention by first dry blending 4,448 grams of finely powdered unstabilized zirconia ($ZrO_2$) having a monoclinic crystal structure with 1,550 grams of finely powdered ceria ($CeO_2$) having a face centered cubic crystal structure.

To 2,568 ml of distilled water, 80 grams of 15 centipoise viscosity "Methocel" binder was added and dissolved. The binder solution was mixed with the blended $ZrO_2$ and $CeO_2$ powders and to this slurry 50 ml of triethanolamine dispersant and 20 ml of 2-octanol antifoamant were added. The entire mix was transferred to a large ball mill consisting of a plastic container with ⅜" diameter $ZrO_2$ balls and the mix was milled overnight. After completion of the ball milling, a stable $CeO_2$-$ZrO_2$ slip/binder mix was obtained which was suitable for spray drying. The slip was spray dried in a laboratory spray dryer that had been adjusted to yield a particle size distribution centered about the 44–74 μm (−200+325 mesh) particle size range. After spray drying, the agglomerated particles were free-flowing and microscopic examination of the individual agglomerates revealed that almost all of the agglomerates were spherical, consisting of agglomerated $CeO_2$ and $ZrO_2$ particles. X-ray diffraction measurements of the agglomerated particles revealed that the constituents were face centered cubic $CeO_2$ and monoclinic $ZrO_2$. This, again, is the state of such agglomerated particles following formation by the Krystyniak process of U.S. Pat. No. 3,373,119.

The spray dried agglomerated particles were next subjected to a careful heat treatment. Before the heat treatment, the spray dried agglomerated particles were loosely poured into a platinum crucible. The crucible was initially placed in a furnace and heated at about 100° C./hr to 400° C. where it was held for 2 hours. The heat treat at 400° C. burned away the Methocel binder without breaking down, i e., fracturing, the agglomerated particles. To achieve interdiffusion of $CeO_2$ and $ZrO_2$ the agglomerates were heated from 400° C. to 1425° C. and held at 1425° C. for 4 hours. X-ray diffraction analysis after heat treatment at 1425° C. for 4 hours revealed that the resultant product was a substantially homogeneous interdiffusion of ceria and zirconia comprising tetragonal and cubic phases with lattice parameters of $a_0 = 5.150 \pm 0.003$ Å, $C_0 = 5.237 \pm 0.003$ Å and $a_0 = 5.150 \pm 0.003$ Å, respectively. After the heat treatment, the previously flowable agglomerates had become a porous, friable mass which could be easily broken down to nearly the original agglomerate size distribution by gentle grinding with a mortar and pestle. After grinding, the particles were microscopically spherical, free-flowing, and suitable for plasma spraying.

EXAMPLE III

Using the above-discussed methods and techniques of EXAMPLE II, a mass of spray dried $ZrO_2$-26 wt. % $CeO_2$ agglomerates were interdiffused at 1500° C. for 4 hours. X-ray diffraction analysis of the resultant interdiffused particles indicated that the particles were substantially homogeneous interdiffused ceria and zirconia comprising tetragonal and cubic phases with lattice parameters of $a_0 = 5.148 \pm 0.006$ Å, $c_0 = 5.236 \pm 0.009$ Å and lattice parameters of $a_0 = 5.148 \pm 0.006$ Å, respectively.

The formation of a substantially homogeneous two phase interdiffusion of the ceria and zirconia of Examples II and III, in contrast to the homogeneous solid solution formed between the yttria and zirconia of Example I, is in consonance with the phase diagrams for these metal oxide systems such as the phase diagrams found at page 140 of *Phase Diagrams for Ceramists* by Levin et al., American Ceramic Society, 1964, which is incorporated herein by reference.

While the invention has been particularly shown and described with reference to several preferred embodiments thereof it will be understood by those skilled in the art that various changes in form and detail may be made therein without departing from the true spirit and scope of the invention as defined by the appended claims.

What is claimed is:

1. A method of forming an interdiffused oxide coating of zirconia and yttria
which comprises
providing a finely divided zirconia powder of monoclinic crystal structure,
providing a finely divided yttria powder of body centered cubic crystal structure,
dispersing the oxides in water containing less than 5% non-volatile organic binder to form a sprayable slurry,
milling the slurry to intimately intermix the oxides,
spray drying the milled slurry to form usable binder bearing particles in the desired size range of about 44 to about 74 μm,
separating the oversize and undersize particles from the usable particles,
heating the usable particles at a temperature which drives off the binder,
heating the particles at a temperature above 1400° C. for a time to form a friable mass of cubic solid solution of $Y_2O_3$ in $ZrO_2$,
pulverizing the friable mass into free flowing particles, and
plasma spraying the particles onto a receiving surface to form an interdiffused oxide coating.

2. A method of forming an interdiffused oxide coating of zirconia and ceria
which comprises
providing a finely divided zirconia powder of monoclinic crystal structure,
providing a finely divided ceria powder of face centered cubic crystal structure,
dispersing the oxides in water containing less than 5% non-volatile organic binder to form a sprayable slurry,
milling the slurry to intimately intermix the oxides,
spray drying the milled slurry to form usable binder bearing particles in the desired size range of about 44 to about 74 μm,
separating the oversize and undersize particles from the usable particles,
heating the usable particles at a temperature which drives off the binder,
heating the particles at a temperature above 1400° C. for a time to form a friable mass of substantially homogeneous interdiffusion of ceria and zirconia comprising tetragonal and cubic phases,
pulverizing the friable mass into free flowing particles, and
plasma spraying the particles onto a receiving surface to form an interdiffused oxide coating.

* * * * *